United States Patent [19]

Neufeld

[11] 4,323,203
[45] Apr. 6, 1982

[54] SELECTIVE ANTI-REVERSE MECHANISM

[75] Inventor: Henry L. Neufeld, Tulsa, Okla.

[73] Assignee: Brunswick Corporation, Skokie, Ill.

[21] Appl. No.: 218,923

[22] Filed: Dec. 22, 1980

[51] Int. Cl.³ ..................... A01K 89/01; A01K 89/02
[52] U.S. Cl. ............................. 242/84.2 A; 74/577 S; 188/82.3; 242/84.5 A
[58] Field of Search .................... 242/84.2 A, 84.2 R, 242/84.21 R, 84.21 A, 84.5 A, 84.51 A, 84.1 R; 74/577 R, 577 S, 577 M, 576; 188/82.3, 82.34, 82.4

[56] References Cited

U.S. PATENT DOCUMENTS

| | | | |
|---|---|---|---|
| 1,217,176 | 2/1917 | Hodge | 74/576 |
| 1,614,847 | 1/1927 | Mortensen et al. | 74/576 X |
| 3,050,271 | 8/1962 | Hull | 242/84.51 A |
| 3,469,799 | 9/1969 | Hull | 242/84.2 A |
| 3,794,264 | 2/1974 | Hull | 242/84.2 R |
| 4,163,528 | 8/1979 | Egasaki et al. | 242/84.51 A |

*Primary Examiner*—Billy S. Taylor
*Attorney, Agent, or Firm*—John G. Heimovics

[57] ABSTRACT

A spin casting style fishing reel is provided with an anti-reverse mechanism which prevents the crank assembly from being rotated in a reverse direction wherein fishing line is payed out, when a selection switch for the mechanism is set in a first position. The selection switch can be selectively moved between the first position and a second position for activation and deactivation of the anti-reverse mechanism. A lever portion of the anti-reverse mechanism has an integral activation arm which follows the movement of the selection switch between the first and second positions, activating and deactivating the anti-reverse mechanism, and a bias receiving arm to which a spring is mounted to hold the activation arm in engagement with the selection switch.

5 Claims, 8 Drawing Figures

SELECTIVE ANTI-REVERSE MECHANISM

DESCRIPTION

1. Technical Field

This invention relates to a spin casting style fishing reel and, more particularly, relates to a spin casting style fishing reel having a unique selectively actuated anti-reverse mechanism.

2. Background Art

Many types of anti-reverse crank rotation devices have been used in the prior art to prevent or control the direction of rotation of the crank handle of spinning style fishing reels which are used to reel in or pay out fishing line. One such device is depicted in U.S. Pat. No. 4,156,510 to Hull, issued May 29, 1979, wherein the anti-reverse element is mounted on the center shaft, protected by a retainer or guide bar and actuated by a central lever mounted inside the fishing reel but extending outside thereof. This mechanism is exemplary of many such mechanisms employed by Hull and others. One of the major drawbacks of such an arrangement is that the mechanism is mounted on the center shaft and, therefore, competes for space on the rear portion of the center shaft with the pinion, support spring and spring keeper which cooperate with the crank handle to retrieve the fishing line.

Improvements have been made on the Hull anti-reverse structure wherein a pawl and lever member are operated by a selection switch to engage a one-way ratchet on the crank gear. The lever member and selection switch are mounted on a relatively large cylindrical portion of the reel body which makes it possible to locate the lever member in a position readily engageable by a selection switch. However, in designing a new reel, it was found to be advantageous to shorten the cylindrical portion of the reel body to simplify the forming of said reel body thereby reducing its cost while at the same time incorporating simplified assembly of the operative parts of the reel. This shortening of the cylindrical portion of the reel body, through which the selection switch communicates with the anti-reverse mechanism, necessitated a redesign of the selective anti-reverse mechanism.

The present selective anti-reverse mechanism described in this application is directed toward the problems heretofore encountered and the concomitant redesign of the selective anti-reverse mechanism.

DISCLOSURE OF INVENTION

This application presents a selective anti-reverse mechanism for a spin casting style fishing reel wherein the portion of the reel through which the operator movable selection switch communicates with the anti-reverse mechanism has been substantially shortened thereby eliminating the purchase area previously enjoyed by prior selection switches and their connected anti-reverse mechanisms.

Toward this end a selective anti-reverse mechanism is provided for a spin casting style fishing reel which has a substantially shortened cylindrical body having mounted thereon, for easy operator access, a selector switch. The selector switch extends through the cylindrical body for communication with the anti-reverse mechanism. The anti-reverse mechanism is comprised of a ratchet mounted upon the crankshaft rotated by the operator through rotation of a connected crank handle. Mounted to the crankshaft contiguous to the ratchet is an anti-reverse drag arm having an activation arm and a convergingly mounted bias receiving arm. A transverse tab extends from the drag arm in a direction parallel to the axis of the crankshaft and is received between a pair of forks in a pawl.

When mounted within the body of the spin casting type reel, the selector switch is received in the notch formed by the convergence of the activation arm and the bias receiving arm. The pawl, pivotally mounted within the cylindrical body, has as one of its forks the stop which will engage the ratchet thereby preventing reverse rotation of the crankshaft and the pay out of fishing line. As the selector switch is rotated, the activation arm, anti-reverse drag arm, held in engagement with the selector switch by a spring interconnected between the crankshaft and the bias receiving arm of the drag arm, pivots about the crankshaft. The pivoting of the drag arm is translated by the tab on the drag arm to pivot the pawl which, in turn, disengages the stop from the ratchet. In the disengaged position, the crankshaft and its connected crank handle can be rotated in both the forward and reverse directions to permit fishing line to be retrieved or paid out.

From the above, it is an object of this application to set forth a selective anti-reverse mechanism which can selectively permit or not permit the reverse rotation of the crankshaft. The selective anti-reverse mechanism requires a minimum amount of space, is able to beneficially employ some of the parts heretofore used in anti-reverse mechanisms, and makes use of this minimum space to exert a maximum amount of bias to hold the anti-reverse mechanism in engagement with the selector switch without sacrificing the durability of the anti-reverse mechanism.

BRIEF DESCRIPTION OF DRAWINGS

FIG. 1A is a rear perspective of the gear and ratchet of the crankshaft;

BEST MODE FOR CARRYING OUT THE INVENTION

Figure 1:
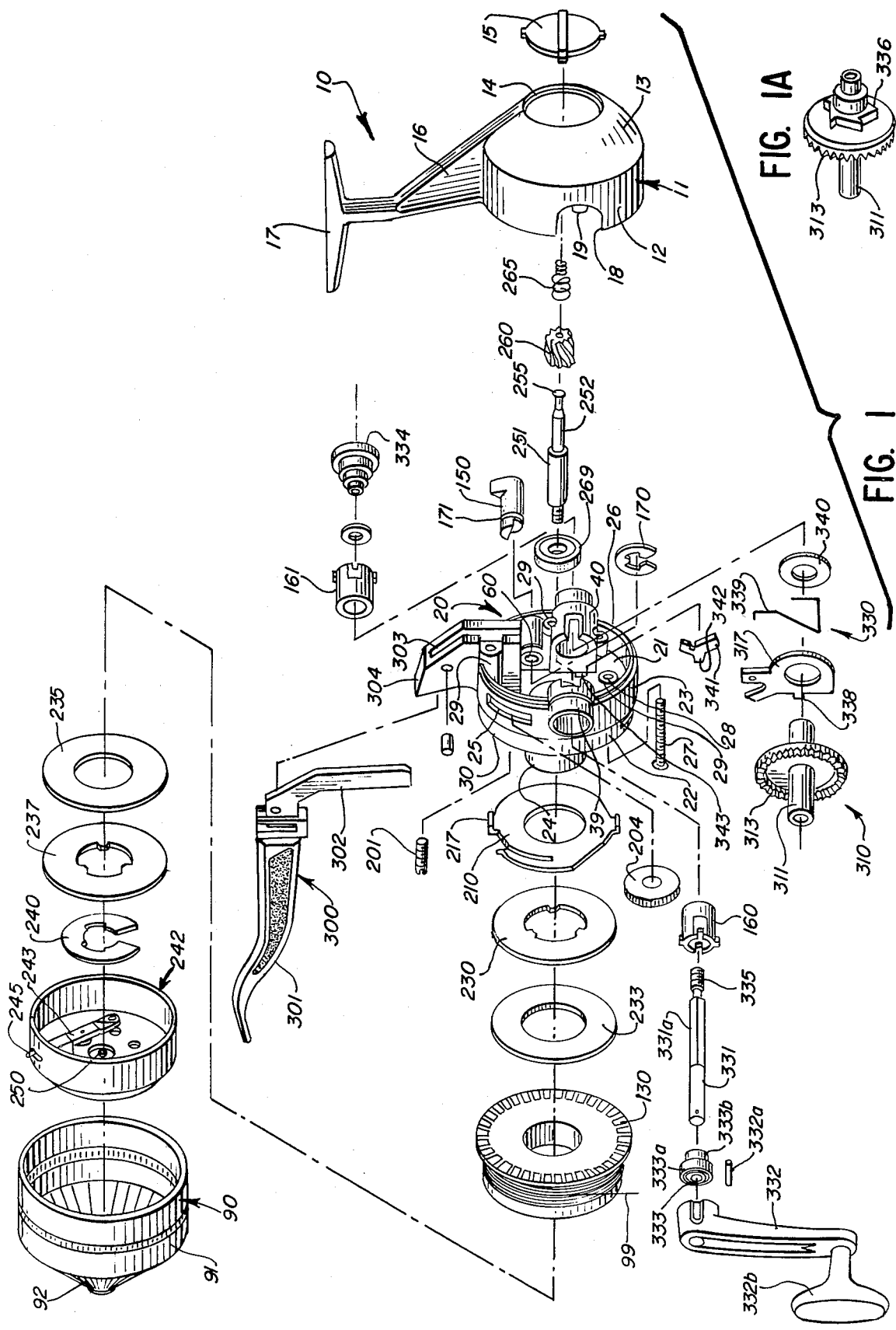
FIG. 1 is an exploded perspective view of a spin casting style fishing reel employing the selective anti-reverse mechanism.

FIG. 1 generally depicts an exploded perspective view of a fishing reel 10 of the spin casting type containing the preferred embodiment of the invention. A back support housing 11, preferably made of an aluminum alloy material, has a cylindrical cover 12, one end of which is open and the other end of which merges into a semi-spherical rear wall 13 having a center opening 14 in which is seated a back cap 15. A stem 16 is integrally cast with the cylindrical cover 12 and has a mounting foot 17 which is used to attach the reel 10 to a spinning style fishing rod (not shown). A body 20, made of a plastic material, such as a glass filled polycarbonate, has a transverse deck plate 21 with a first or forward circumferential body portion 22 and a second or rearward circumferential body portion 23. A central hub 24 projects forward of the deck plate 21 with a drag plate 210, back spool washer 230, back flat drag washer 233, spool assembly 130, front flat drag washer 235, front spool washer 237, all secured to the hub 24 by means of spool retainer clip 240 which fits into a groove (not shown in FIG. 1) in the distal end of hub 24. The body 20 is secured to the back support housing 11 by inserting an inset flange 26 on the rearward body portion 23 of the body 20 into the one open end of the cylindrical cover 12 of the back support housing 11 and threading screws 27, only one of which is shown in FIG. 1, through apertures 28 in bosses 29 formed through and on the deck plate 21 and into mating bosses (not shown in FIG. 1) in the back support housing 11. A front cover 90, which has a cylindrical body portion 91 and a cone-shaped front portion 92, is secured on an offset portion 30 of the forward body portion 22.

A center shaft 251 is mounted in a center hole (not shown in FIG. 1) in the hub 24 with a spinner head assembly 242 threaded by means of the threaded opening 250 on the forward threaded end of the shaft 251. The spinner head assembly 242 partially surrounds the forward flange of the spool assembly 130 with fishing line 99 being wound thereon. The cone-shaped front portion 92 of the front cover 90 has a front hole (not shown in FIG. 1) which acts as a fishing line guide as the line 99 is cast from the reel 10 and rewound after casting.

A clutch head screw 201 passes through a pilot hole or guide (not shown in FIG. 1) in the deck plate 21 with the slotted head of the screw positioned in the interior of the forward body portion 22 and with a clutch wheel 204 projecting outward of a slot 25 in the rearward body portion 23 threadingly engaging with the body of the clutch head screw 201 where the screw projects into said rearward body portion 23. A tab 217 on the drag plate 210 fits into the head of screw 201 so that when the clutch wheel 204 is revolved upward toward stem 16, the screw 201 advances forward toward the spool retainer clip 240, increasing the clamping force on the spool assembly 130 so that the ability of the spool assembly 130 to revolve relative to the hub 24 is decreased. When the clutch wheel 204 is revolved away from the stem 16, the clamping force is decreased and the spool assembly 130 is permitted to revolve more freely relative to hub 24, thus providing the adjustable drag mechanism for the fishing reel 10.

The center shaft 251 is slidably and rotatably mounted in a bearing 269 which is mounted in the rear of the hub 24 in the deck plate 21. A pinion gear 260 is splined on a reduced diameter portion 252 of the center shaft 251 and is resiliently maintained in a forward position against the deck plate 21 by a center shaft spring 265. The pinion gear 260 and center shaft 251, being splined together, will have relative axial sliding motion, but rotation of the pinion gear 260 will rotate the center shaft 251. The spring 265 bears against an abutting end 255 on the center shaft 251 to urge the pinion gear 260 against the deck plate 21 and to urge the center shaft 251 in a rearward direction relative to the deck plate 21.

A finger brake lever 300 is mounted on the body 20 with an operating handle 301 exterior of and extending forwardly from the first or forward body portion 22. An operating leg 302 extends through a slot 303 in an upstanding bracket 304 on the body 20 and into the second or rearward body portion 23 for operable contact with the rearward end 255 of the center shaft 251. When the exterior operating handle 301 of the finger brake lever 300 is pulled upward toward the mounting foot 17, operating leg 302 engages the end 255 of the center shaft 251. The center shaft 251 and the spinner head assembly 242 mounted thereon are pushed forward relative to the bearing 269 and the hub 24. A pickup pin mechanism 243, mounted on and within spinner head assembly 242, is, at this point, in retracted position and cooperates with a forward face of a cam (not shown in FIG. 1) carried by the face of the hub 24. When the finger brake lever 300 is fully pivoted toward the mounting foot 17, the spinner head assembly 242 is held in a brake position against the inside of the front cover 90 to trap the line 99 therebetween to prevent casting of the line. Slightly releasing the finger brake lever 300 will maintain the spinner head assembly 242 in a forward casting position, but the spring 265 will retract the center shaft 251 and the spinner head assembly 242 enough to unclamp the fishing line 99 whereby the spinner head assembly 242 will not interfere with the fishing line 99 which can then be cast freely from the reel 10.

A crank assembly 310 is mounted in transversely extending hollow bearing bosses 39 and 40 integrally formed on the wall of the rearward body portion 23. Crank bearing sleeve means 160 and 161 are mounted respectively in the bearing bosses 39 and 40 to provide suitable bearings for a hollow crankshaft 311 of the crank assembly 310. The hollow crankshaft 311 supports an anti-reverse assembly 330 which will be described in more detail hereinafter.

A crank rod 331 is pivotally connected to a crank handle 332 by means of a pin 332a and the crank rod 331 is slip-fitted into the hollow crankshaft 311 and has flats 331a which mate with flats in the hollow crankshaft 311 to key the crankshaft 311 thereto. A fitting 333 which slides on the crank rod 331 inwardly of the pin 332a has an outer portion 333a that slides easily into one of the bosses 39 or 40 and has an inner portion 333b of smaller diameter which slides easily into the outer end of one of the crank bearing sleeve means 160 or 161. A crank rod nut 334 is secured to a threaded end 335 of the crank rod 331 to fasten said rod 331 to the reel 10. The crank rod 331 can be removed from the side of the reel 10 that it occupies in FIG. 1, and mounted in the opposite side by unfastening the nut 334 in sleeve means 161, removing the crank handle 332 and crank rod 331 from the hollow boss 39, inserting the crank rod 331 in the hollow boss 40, and refastening the nut 334 on the end of the rod in the sleeve means 160. The crank handle 332 has a crank knob 332b for gripping by the hand of the user.

Fixed to the hollow crankshaft 311 is a face gear 313 which is in engageable contact with the pinion gear 260 on the shaft 251 so that when the crank handle 332 is rotated in a forward direction (toward the front cover 90 as viewed in FIG. 1), the shaft 251 rotates causing the spinner head assembly 242 to rotate as well. This rotative motion disengages the pickup pin mechanism 243 from the forward face of the cam on the hub 24, causing the spinner head assembly 242 to move rearward as the pickup pin mechanism 243 rides up the cam to extend the pickup pin 245 outwardly beyond the spinner head assembly 242 so that the rotation of the crank handle 332 will rotate the spinner head assembly 242 to wind the fishing line 99 on the spool assembly 130.

Crank assembly 310 is coupled with an anti-reverse assembly 330, which comprises a ratchet 336, mounted on the crankshaft 311 against the back side of face gear 313 as shown in FIG. 1(a), an anti-reverse drag arm 337 having a transverse lug 338, a drag spring 339 and spacer washer 340 all mounted on the hollow crankshaft 311. An anti-reverse pawl 341 having a pivot tang 342 pivotably mounted in an aperture 343 in the deck plate 21, is positioned against the back of the face gear 313 between the deck plate 21 and the transverse lug 338 on the drag arm 337 for engageable and disengageable contact with the ratchet 336.

Anti-reverse actuator 150 is mounted in upper housing sleeve 60 that opens through the wall of the rearward body portion 23 of body 20 and the actuator 150 is retained in the sleeve 60 by retainer clip 170 seated in slot 171 in the body of the anti-reverse actuator 150. The anti-reverse actuator 150 is in cooperative contact, as will be described hereinafter, with the anti-reverse drag arm 317. In one position, the actuator 150 disengages the anti-reverse assembly 330 permitting the crank rod 331 and the crank assembly to rotate in either the forward direction (upward toward the stem 16) or the reverse direction (downward from the stem 16 toward the back of the reel 10). In the other position of the actuator 150, the crank assembly can rotate to wind the line 99 on the spool 130.

Figure 2:
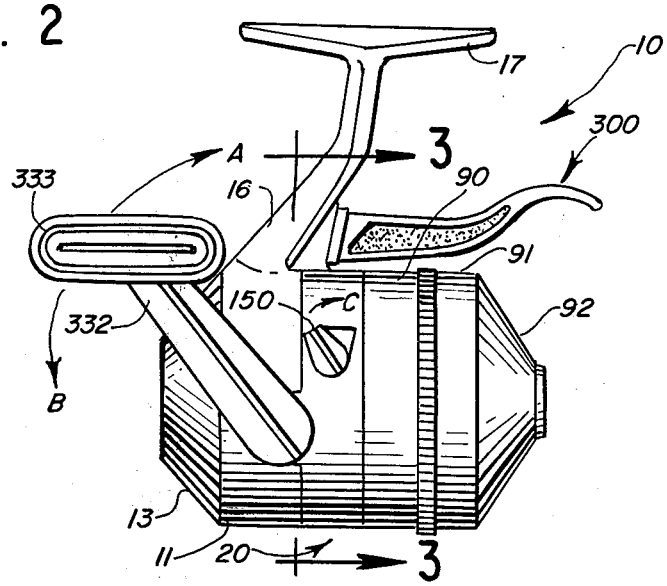
FIG. 2 is a side view of the spin casting style fishing reel showing the selection switch mounted thereon.
Figure 3:
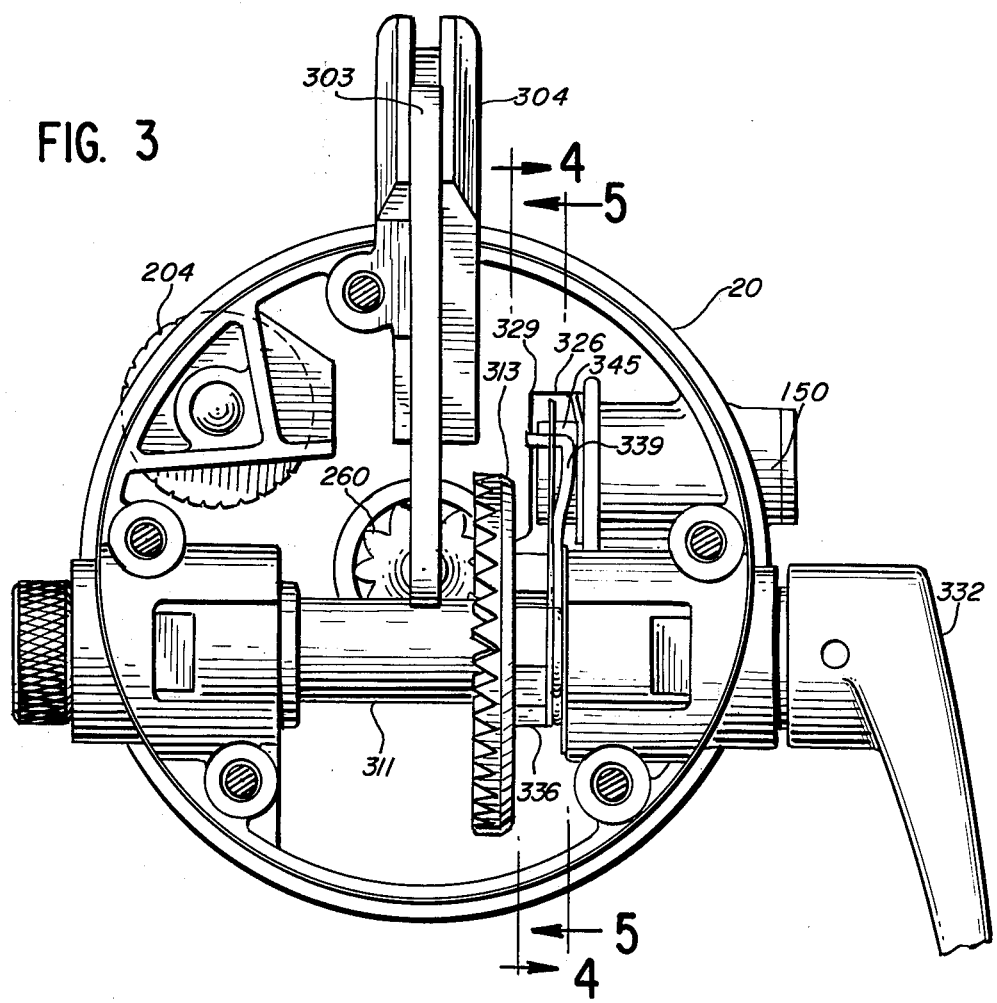
FIG. 3 is a section view of the spin casting style fishing reel taken along the line 3—3 of FIG. 2.

Viewing FIGS. 1A-7, the structure and operation of the anti-reverse assembly 330, to which this application is addressed, is seen in more detail. FIG. 2 shows a side view of the assembled, previously described, spin casting style fishing reel 10 incorporating the selective anti-reverse assembly 330. To the body 20, the anti-reverse actuator 150 is rotatably mounted. As shown in FIG. 2, the anti-reverse actuator 150 is positioned in an engaged position wherein the crank handle 332 cannot be rotated in a reverse direction B. The crank handle 332 is permitted to rotate in only a forward direction A which, due to the aforementioned structure of the fishing reel 10, reels in fishing line 99 by winding it about the spool assembly 130.

Figure 6:
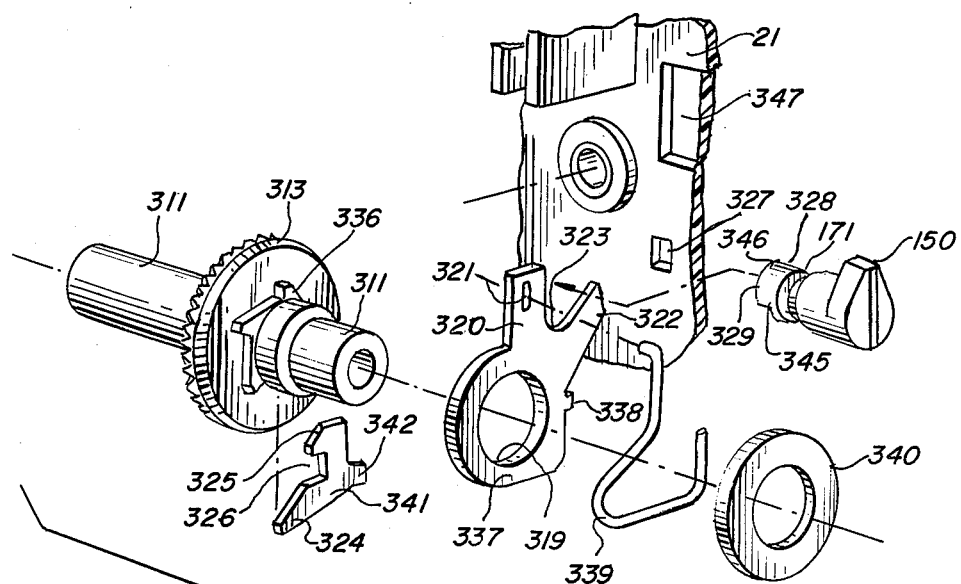
FIG. 6 is an exploded perspective view of the selective anti-reverse mechanism.

Turning to FIGS. 1A and 6, the construction of the selective anti-reverse assembly 330 is shown in exploded fashion. The hollow crankshaft 311 is keyed to the crank rod 331 which is operable by rotation of the crank handle 332 shown in FIG. 2. A face gear 313, located on the crankshaft 311, meshes with the pinion gear 260 of FIG. 1 so as to transmit the rotation of the crank handle 332 into rotation of the pinion gear 260 and the center shaft 251. As previously set forth, rotation of the center shaft 251 rotates the spinner head assembly 242 to wind or unwind fishing line 99 to or from the spool assembly 130 depending upon which direction the crank handle 332 is rotated.

Near the face gear 313, a circular ratchet 336 is secured to the crankshaft 311. The ratchet 336 in cooperation with the anti-reverse pawl 341 serves to effectively restrict, when actuated, the rotation of the crankshaft 311 and the elements depending therefrom.

Abutting the ratchet 336, opposite the face gear 313, is the anti-reverse drag arm 337. The anti-reverse drag arm 337 has a drag arm bore 319 which is slightly larger than that of the crankshaft 311. When mounted upon the crankshaft 311, the drag arm bore 319 receives the crankshaft 311 therethrough and, due to the larger diametered drag arm bore 319, is free to pivot upon said crankshaft 311. The anti-reverse drag arm 337 with its drag arm bore 319 is basically, as viewed in FIG. 6, D-shaped. To achieve the D-shape, a rectangular bias arm 320 extends from the drag arm bore 319 in approximately a radial direction. At the distal end of the bias arm 320, a slot extends through the bias arm 320 to form the bias mount 321. Angularly disposed from the bias arm 320, a lever arm 322 likewise extends from the drag arm bore 319 in approximately a radial fashion. It should be noted that the lever arm 322 tapers as it extends to form a pointed, distal end. The juncture of the bias arm 320 and the lever arm 322 is semi-circular of a radius comparable to that of the anti-reverse actuator 150, and is shown as actuator notch 323. Completing the structure of the anti-reverse drag arm 337 is a lug 338 which extends transverse to the anti-reverse drag arm 337 towards the ratchet 336. The lug 338 is rectangular and lies at the side of the anti-reverse drag arm 337 in the proximity of the interface between the lever arm 322 with the body of the anti-reverse drag arm 337.

From the aforementioned and viewing FIG. 6, the assembly of the selector anti-reverse assembly 330 can be put forth. Pursuant to the general assembly of the fishing reel 10, the anti-reverse drag arm 337 is mounted to the crankshaft 311 abutting the ratchet 336. A foot-shaped drag spring 339 is clipped upon the crankshaft 311 such that one end of the drag spring 339 extends into the bias mount 321. The drag spring 339 pivots in response to and in the same direction as the crankshaft 311. In pivoting the drag spring 339 exerts a bias upon the anti-reverse drag arm 337 through the connection between the drag spring 339 and the bias mount 321 of the bias arm 320. It should be noted at this point that the attachment of the drag spring 339 to the bias arm 320 exerts a maximum moment obtainable upon the anti-reverse drag arm 337 which, in turn, results in the fast response of the anti-reverse drag arm 337 to the rotation of the crankshaft 311. The drag spring 339 could not advantageously be connected to the lever arm 322 and exert the same moment upon the anti-reverse drag arm 337 without interfering with the actuator notch 323, or hindering the pivoting of the anti-reverse drag arm 337 or sacrificing the structural integrity of the lever arm 322 due to its tapered construction. A spacer washer 340 is placed over the crankshaft 311 to sandwich the drag spring 339 between it and the anti-reverse drag arm 337. The aforementioned assembly is aligned with the crank bearing sleeve means 160,161 in the body 20. As previously described, the crank rod 331 is extended between the crank bearing sleeve means 160,161 and the crankshaft 311 thereby securing the crankshaft 311, anti-reverse drag arm 337, drag spring 339 and spacer washer 340 within the fishing reel 10.

The pawl 341, to cooperate with the above structure, has a pivot tang 342 opposed by a stop 324 and a pawl arm 325 connected in such a manner as to give the pawl 341 an overall Y-shape. The stop 324, somewhat longer than the pawl arm 325, tapers to a point distal of the tang 342. A lug notch 326, opposed by the tang 342, separates the stop 324 from the shorter pawl arm 325 and forms therebetween a receptacle for the lug 338. The pawl 341 is mounted to the center deck plate 21 by location of the tang 342 into a sinkage 327 in the center deck plate 21. As seen in FIGS. 4-7, the tang 342 is free to rock within the sinkage 327 as it engages and disengages the anti-reverse drag arm 337. As can further be seen in FIG. 4 especially, the pawl 341 is held within the fishing reel 10 due to the placement of the lug 338 into the lug notch 326, as the fishing reel 10 is assembled, thereby suspending the pawl 341 between the lug 338 and the sinkage 327. The pawl 341 is laterally trapped, but is freely pivotable about tang 342, between the face of the anti-reverse drag arm 337 and the back face of the gear 313, with the pawl 341 being between the ratchet 336 and the sinkage 327.

Figure 4:
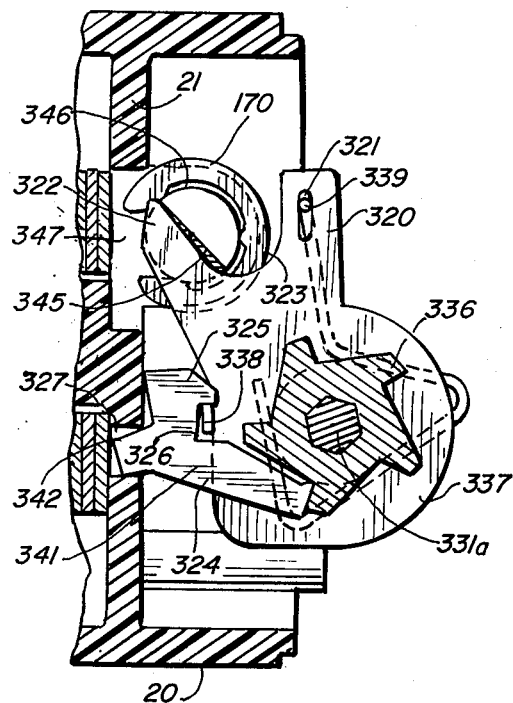
FIG. 4 is a section view of the anti-reverse mechanism shown in the actuated position, wherein the reel crank cannot be rotated in reverse, taken along line 4—4 of FIG. 3.

To complete the assembly of the selective anti-reverse assembly 330, the anti-reverse actuator 150 is inserted through the sleeve 60 on the body 20 such that its end, the cam end 328, lies within the actuator notch 323, as best shown in FIG. 4. A retainer clip 170 is seated into the slot 171 within the body 20 to firmly hold the anti-reverse actuator 150 to the body 20. As can be observed in FIG. 4, the anti-reverse actuator 150 extends into the body 20 very near the center deck plate 21 so as to be angularly disposed from the crankshaft 311. As can further be seen, the cam end 328 is formed to have a hemispherical boss 329 having a flat cam face 345 and, as its outer perimeter, a rounded cam face 346.

Figure 5:
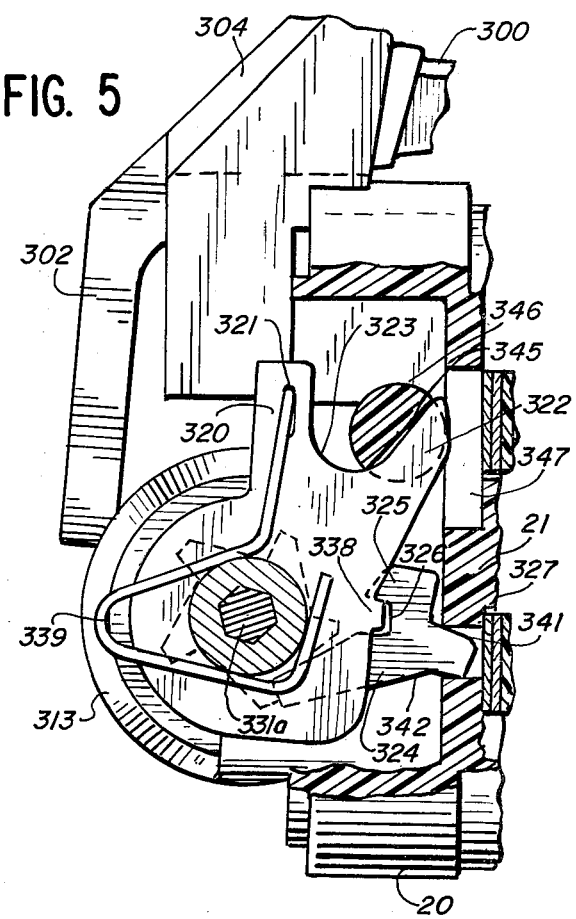
FIG. 5 is a view of the opposite side of the anti-reverse mechanism shown in FIG. 4 taken along line 5—5 of FIG. 3.

From the above, the operation of the selective anti-reverse assembly 330 can be described. With the anti-reverse actuator 150 in the position shown in FIGS. 1-5, the crank handle 332 is constrained to rotate in only the fishing line 99 retrieval, forward, direction A. As best depicted in FIGS. 4-5, this position of the anti-reverse actuator 150 mates the flat cam face 345 of the cam end 328 with the lever arm 322. The bias exerted by the drag spring 339 upon the bias arm 320, maintains this mating engagement in response to the rotation of the crankshaft 311. With the flat cam face 345 and lever arm 322 in this position, the lug 338 is located within the lug notch 326 with the pawl arm 325 resting thereupon. With the lug 338 so orientated, the pawl 341 is seated within the sinkage 327 such that the stop 324 is in engagement with the ratchet 336. Due to the construction of the ratchet 336, its engagement by the stop 324 precludes the clockwise rotation of the crankshaft 311, as viewed in FIG. 4, and also the reverse rotation B of the crank handle 332, as seen in FIG. 2. The constraint of rotation of the crank handle 332 to the forward direction A of FIG. 2 prevents the pay out of fishing line 99, except for the pay out accomplished by overcoming the drag on the spool 131 created by the drag wheel 204, drag screw 201, drag plate 210 and drag washers 233,235. However, due to the tapered design of the ratchet 336, the operator can rotate the crank handle 332 in a forward direction (shown as A in FIG. 2) which retrieves the fishing line 99.

Figure 7:
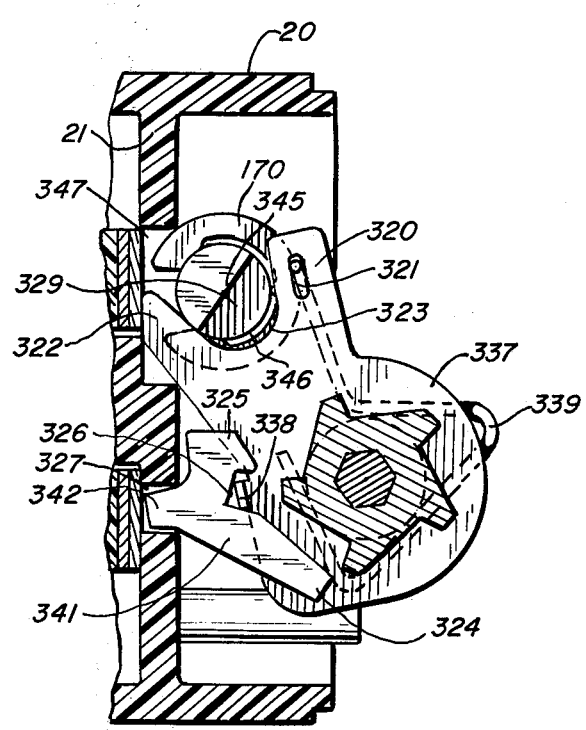
FIG. 7 shows the anti-reverse mechanism shown in FIG. 4 with the selector switch rotated to the deactivation position wherein the reel crank can be rotated both forward and reverse.

To deactivate the anti-reverse assembly 330, the operator moves the anti-reverse actuator 150 in direction C of FIG. 2. The resultant rotation of the cam end 328 disengages the flat cam face 345 from the lever arm 322. In so doing, the round cam face 346 engages the lever arm 322 to pivot the anti-reverse drag arm 337 towards the center deck plate 21. As shown in FIG. 7, the amount of translation required by the lever arm 322 necessitates that a rectangular cutout 347 be made in the center deck plate 21 to receive the lever arm 322 as it fully pivots. It should be noted, that since the drag spring 339 is connected to the separate bias arm 320, the drag spring 339 cannot interfere with the pivoting of the lever arm 322 as it moves into the rectangular cutout 347. When movement of the anti-reverse actuator 150 is completed, the rounded cam face 346 will seat within the actuator notch 323 and the lever arm 322 will be pivoted to its maximum extent. The pivoting of the lever arm 322 is translated by the lug 338 into the pivoting of the pawl 341 within its sinkage 327 as substantially shown in FIG. 7. This pivoting of the pawl 341 disengages the stop 324 from the ratchet 336 thereby freeing the crankshaft 311 and its crank handle 332 for both the forward and reverse rotation shown by A and B, respectively, in FIG. 2.

While I have shown and described certain embodiments of a selective anti-reverse mechanism, it is to be understood that it is susceptible to many modifications. Changes, therefore, in the construction and arrangement may be made without departing from the spirit and scope of the device set forth above and as described in the attached claims.

I claim:

1. In a spinning reel having a body portion of a deck plate with a first portion having a cylindrical wall projecting transverse to the deck plate and a second portion having a cylindrical wall projecting from the deck plate opposing the first portion, spaced apart aligned bearing means mounted in the cylindrical wall of the second portion and extending from the interior of the wall to the exterior of the wall, and a crank assembly rotatably mounted in the bearing means and extending therebetween having a crankshaft operable by a crank handle, and a gear mounted upon the shaft whereby rotation of the crank handle turns the gear to retrieve or to pay out fishing line, a selective anti-reverse device comprising:
   a ratchet mounted upon the shaft for rotation therewith;
   pawl means mounted upon the deck plate to pivotally engage the ratchet and prevent the pay out of fishing line and disengage the ratchet to permit both retrieval and pay out of the fishing line;
   an anti-reverse drag means pivotally mounted upon the shaft having a lug in contact with the pawl means to pivot the pawl means in response to the pivoting of the anti-reverse drag means, and having a pair of diverging first and second arms;
   an actuator means extending through the first portion between the first and second arms, the actuator means having a cam contacting the second arm to pivot the anti-reverse drag means in response to operation of the actuator means which, in turn, pivots the pawl means for engagement and disengagement of the ratchet; and
   bias means interconnected between the shaft and the first arm to bias the pivoting of the anti-reverse drag means in the direction of shaft rotation thereby maintaining the engagement between the cam and the second arm.

2. A selective anti-reverse device as described in claim 1 wherein the pawl means is comprised of:
   a tang pivotally located in a sinkage in the deck plate;
   a stop angularly opposing the tang for engagement with the ratchet; and
   a pawl arm opposing the tang joining, in cooperation with the stop, a lug receiving notch.

3. A selective anti-reverse device as described in claim 2 wherein the anti-reverse drag means is comprised of:
   a main body having a shaft mounting bore therethrough of a diameter to permit the pivoting thereof;

the first arm being a bias arm extending radially from the main body to be transverse to the shaft;

the second arm being a lever arm extending radially from the main body and angularly disposed from the bias arm to form therebetween an actuator notch; and a lug which extends from the body parallel to the shaft for engagement with the lug receiving notch.

4. A selective anti-reverse device as described in claim 3 wherein the bias means is a triangular spring encircling the shaft, the spring having an end connected to the bias arm whereby rotation of the shaft imparts a pivot force to the spring and to the bias arm to pivot the anti-reverse drag means.

5. A selective anti-reverse device as described in claim 3 wherein the deck plate has a cutout to receive and allow the full pivoting of the lever arm when the actuator means is operated.

* * * * *